(No Model.)
N. PETERSON & H. SOMMER, Jr.
APPARATUS FOR DISTILLING LOW WINES.
No. 305,329. Patented Sept. 16, 1884.
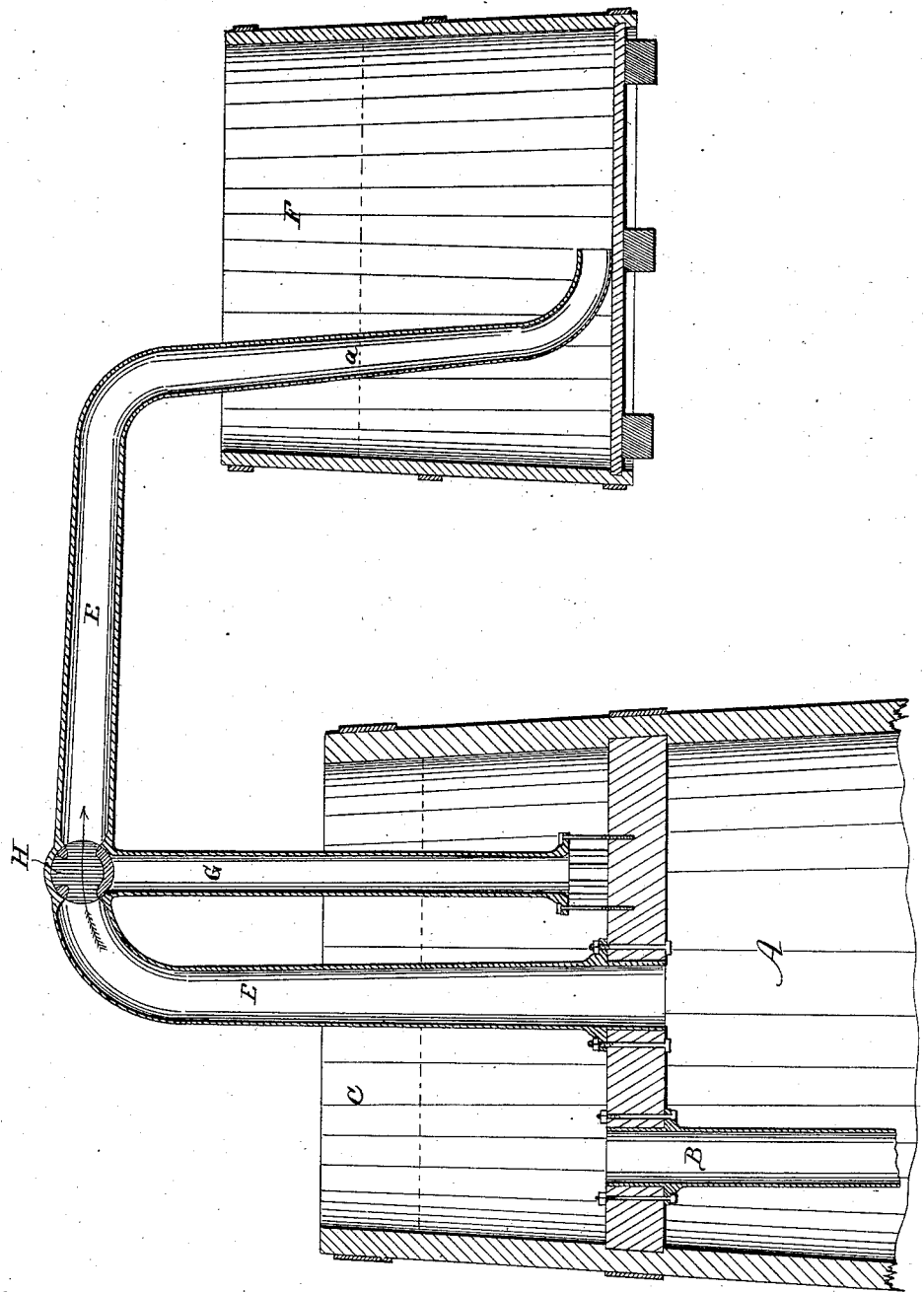
WITNESSES:
Thos. Houghton.
H. X. Stevens.
INVENTORS:
N. Peterson
H. Sommer, Jr.
BY
ATTORNEYS.

UNITED STATES PATENT OFFICE.

NELS PETERSON AND HENRY SOMMER, JR., OF DAVENPORT, IOWA.

APPARATUS FOR DISTILLING LOW WINES.

SPECIFICATION forming part of Letters Patent No. 305,329, dated September 16, 1884.

Application filed April 4, 1884. (No model.)

*To all whom it may concern:*

Be it known that we, NELS PETERSON and HENRY SOMMER, Jr., citizens of the United States, residing at Davenport, in the county of Scott and State of Iowa, have invented certain new and useful Improvements in Apparatus for Distilling Low Wines, of which the following is a description.

This invention relates to that class of apparatus used for distilling low-wines; and it has for its object an improvement in such apparatus, the better to adapt it to the manufacture of vinegar.

To this end our invention consists in the construction and combination of parts hereinafter described and claimed, reference being had to the accompanying drawing, which is a vertical section of a portion of a still, a condenser, and the connecting-pipe.

A represents the upper chamber of the still.

B is the charge-pipe, through which the products of fermentation, called "beer," pass into the still.

C is the receiving tube or charger, into which the products of fermentation are placed, to enter the still through said pipe B.

E is the vapor-pipe, which communicates between the still A and the condenser F. Thus far we have described only what is common.

In the process of condensing the vapor of the still with such apparatus as this above described the wine or vinegar in the stock-tub F becomes quickly heated, so that only the heavier portion of the vapor is condensed, the lighter portion remaining in the pipe E above the top-line *a* of the wine until it is forced through the wine by more vapor rising into the pipe. By this action the light vapor delivers all its heat to the wine until it raises the wine to a temperature that allows the light vapor to pass through it, and further causes the whole surface of the wine to vaporize into the air, thus losing a large percentage of the products of distillation. To prevent this loss we pro-
vide a pipe, G, communicating between the upper portion of the vapor-pipe E and the lower portion of the charger C, which latter contains the cold beer.

H is a three-way cock, which may at any time be turned to open or to close the communication between the pipes E and G. When the pipe G is opened, the light vapor in pipe E is quickly condensed by the cold beer and gathered therein. At the same time all its heat is imparted to the beer, thus raising the temperature of the latter before it enters the still. By this means we accomplish the purpose of saving the light vapor, of saving the heat it contained, and of preventing said heat from causing a wasteful evaporation by overheating the wine in the stock-tub. The same purpose would be accomplished by placing the lower end of pipe G in any other vessel or tub than the charger C, provided the said vessel or tub were used for the same purpose, of holding the beer immediately previous to distillation. Other devices equivalent in action to a three-way cock, H—such as three different cocks, one in pipe G and one each side thereof in pipe E—might be used in its stead.

What we claim as our invention, and desire to secure by Letters Patent, is—

The combination, with the still A, the receiving-tub C over it, and the charge-pipe B, communicating between the tub and the still, of a vapor-pipe, E, communicating with a stock-tub, F, a pipe, G, communicating between the upper portion of the vapor-pipe E and the lower portion of the charger C, and a three-way cock, H, connecting the pipes E and G, as shown and described.

NELS PETERSON.
HENRY SOMMER, JR.

Witnesses:
B. C. FRIEDHOLDT,
JOHN BERWALD.